(12) United States Patent
Sten et al.

(10) Patent No.: US 8,651,991 B1
(45) Date of Patent: Feb. 18, 2014

(54) DRIVE MODULE WITH PARKING BRAKE

(71) Applicant: eAAM Driveline Systems AB, Trollhättan (SE)

(72) Inventors: Erik J. Sten, Trollhättan (SE); Mikael P. Larsson, Nödinge (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 13/755,560

(22) Filed: Jan. 31, 2013

(51) Int. Cl.
*F16H 48/30* (2012.01)
*F16H 37/08* (2006.01)

(52) U.S. Cl.
USPC .......................................... 475/150; 475/204

(58) Field of Classification Search
USPC ..................... 475/150, 204, 205, 221, 225
See application file for complete search history.

(56) References Cited

U.S. PATENT DOCUMENTS

| | | | |
|---|---|---|---|
| 5,429,212 A | 7/1995 | Schlosser | |
| 5,807,205 A | 9/1998 | Odaka et al. | |
| 6,074,321 A | 6/2000 | Maeda et al. | |
| 6,692,394 B2 | 2/2004 | Takenaka | |
| 7,448,978 B2 | 11/2008 | Habel | |
| 2005/0159861 A1 | 7/2005 | Iwatsuki et al. | |
| 2007/0087889 A1* | 4/2007 | Rosemeier et al. | 475/205 |
| 2008/0176702 A1* | 7/2008 | Showalter | 475/204 |
| 2010/0240485 A1* | 9/2010 | Strasser et al. | 475/150 |
| 2011/0094806 A1 | 4/2011 | Mack et al. | |
| 2012/0058855 A1 | 3/2012 | Sten | |
| 2012/0283061 A1* | 11/2012 | Karlsson et al. | 475/150 |

* cited by examiner

*Primary Examiner* — Edwin A Young
(74) *Attorney, Agent, or Firm* — Harness, Dickey & Pierce, P.L.C.

(57) ABSTRACT

A drive module that includes a housing, first and second axle shafts, a differential assembly, a propulsion motor, a brake element fixed to the housing, a torque-vectoring transmission and a mode gear. The differential assembly is mounted in the housing for rotation about a rotational axis and has a differential case and a pair of output members. A first one of the output members is coupled to the first axle shaft for common rotation. The torque-vectoring transmission cooperates with the differential assembly to transmit rotary power to the second axle shaft. The mode gear is movable between a first position and a second position. Positioning of the mode gear in the first position permits transmission of rotary power between the propulsion motor and the differential assembly. Positioning of the mode gear in the second position couples the differential assembly to the housing to inhibit rotation of the first axle shaft.

17 Claims, 3 Drawing Sheets

DRIVE MODULE WITH PARKING BRAKE

FIELD

Figure 1:
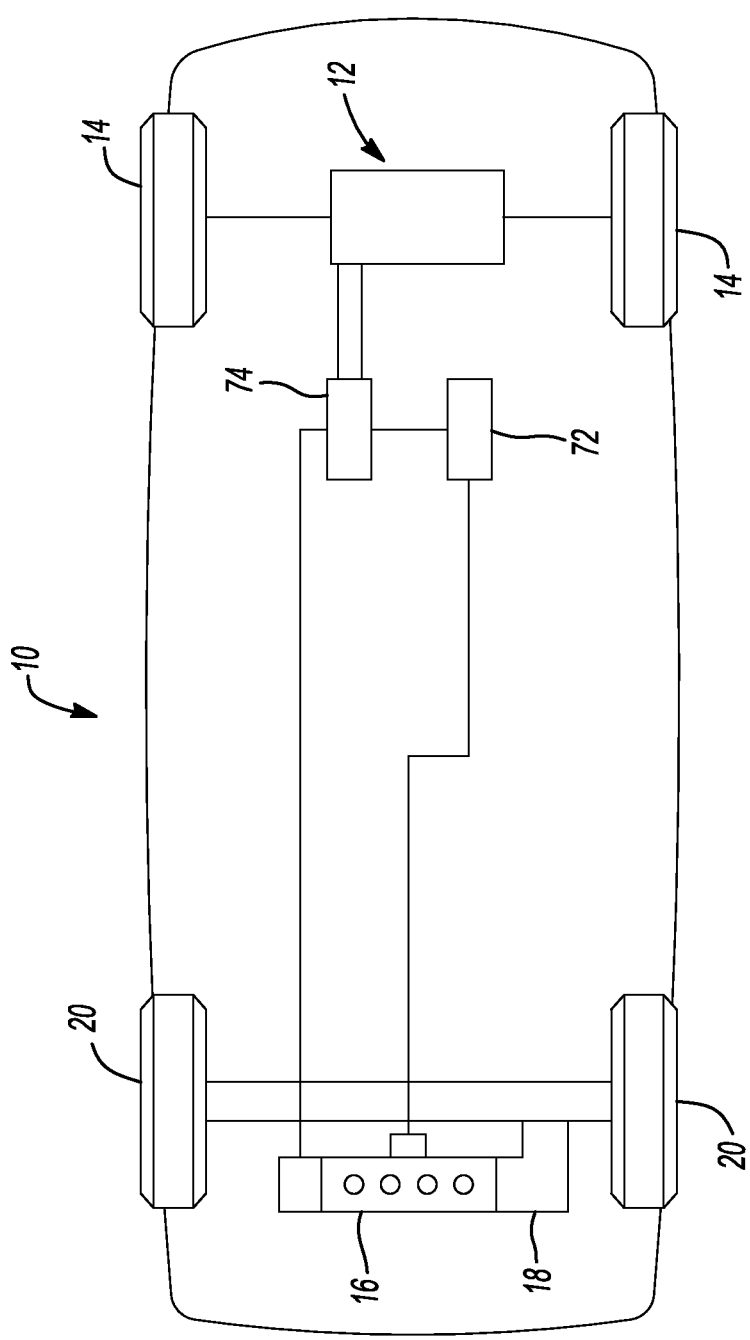

The present disclosure relates to a parking brake for a drive module with a parking brake.

BACKGROUND

This section provides background information related to the present disclosure which is not necessarily prior art.

An axle assembly with a torque distribution drive mechanism is described in co-pending U.S. application Ser. No. 13/182,153. It would be beneficial in some instances to lock the axle shafts of the torque distribution drive mechanism against rotation. Drawbacks of some of the known parking brake mechanisms include a relatively complex locking mechanism and/or a locking mechanism that is relatively difficult to integrate or package into the torque distribution drive mechanism.

SUMMARY

This section provides a general summary of the disclosure, and is not a comprehensive disclosure of its full scope or all of its features.

In one form, the present teachings provide a drive module that includes a housing, first and second axle shafts, a differential assembly, a propulsion motor, a brake element fixed to the housing, a torque-vectoring transmission and a mode gear. The differential assembly has a differential case and a pair of output members. The differential assembly is mounted in the housing for rotation about a rotational axis. A first one of the output members is coupled to the first axle shaft for common rotation. The torque-vectoring transmission cooperates with the differential assembly to transmit rotary power to the second axle shaft. The mode gear is movable between a first position and a second position. Positioning of the mode gear in the first position permits transmission of rotary power between the propulsion motor and the differential assembly. Positioning of the mode gear in the second position couples the differential assembly to the housing to inhibit rotation of the first axle shaft.

In another form, the present teachings provide a drive module that includes a housing, first and second axle shafts, a differential assembly, a propulsion motor, an input transmission that is configured to receive rotary power from the propulsion motor, a brake element fixed to the housing, a torque-vectoring transmission, a torque-vectoring motor, and a mode gear. The differential assembly has a differential case and a pair of output members. The differential assembly is mounted in the housing for rotation about a rotational axis. A first one of the output members is coupled to the first axle shaft for common rotation. The torque-vectoring transmission receives rotary power from the differential case and is configured to output rotary power to the second axle shaft. The torque-vectoring motor is selectively operable to provide a secondary input to the torque-vectoring transmission to change a torque distribution between the first and second axle shafts. The mode gear is movable between a first position and a second position. Positioning the mode gear in the first position couples the input transmission to differential assembly such that rotary power produced by the propulsion motor is employed to drive the differential assembly. Positioning the mode gear in the second position couples the differential assembly to the housing to inhibit rotation of the first and second axle shafts.

In yet another form, the present teachings provide a method for operating a drive module having a housing, an input transmission, first and second axle shafts, a differential assembly, a propulsion motor, a torque-vectoring transmission, a mode gear and a brake element. The differential assembly has a differential case and a pair of output members. The differential assembly is mounted in the housing for rotation about a rotational axis. A first one of the output members is coupled to the first axle shaft for common rotation. The torque-vectoring transmission is configured to cooperate with the differential assembly to transmit rotary power to the second axle shaft. The brake element is fixed to the housing. The method includes: positioning the mode gear in a first position to couple the input transmission to differential assembly such that rotary power produced by the propulsion motor is transmitted through the mode gear and employed to drive the differential assembly; and positioning the mode gear in a second position that couples the differential assembly to the housing to inhibit rotation of the first and second axle shafts.

In still another form, the present teachings provide a transmission having a planetary stage with a planet carrier and a planet gear. The planet carrier comprises a carrier body and a pin that is fixedly coupled to the carrier body. The planet gear is rotatably mounted on the pin. The carrier body comprises a feature that is configured to direct lubricant to an interface between the pin and the planet gear. At least one lubricant egress aperture is formed in the planet gear between the axial ends of the planet gear to permit a discharge of lubricant that is drawn into the interface between the pin and the planet gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
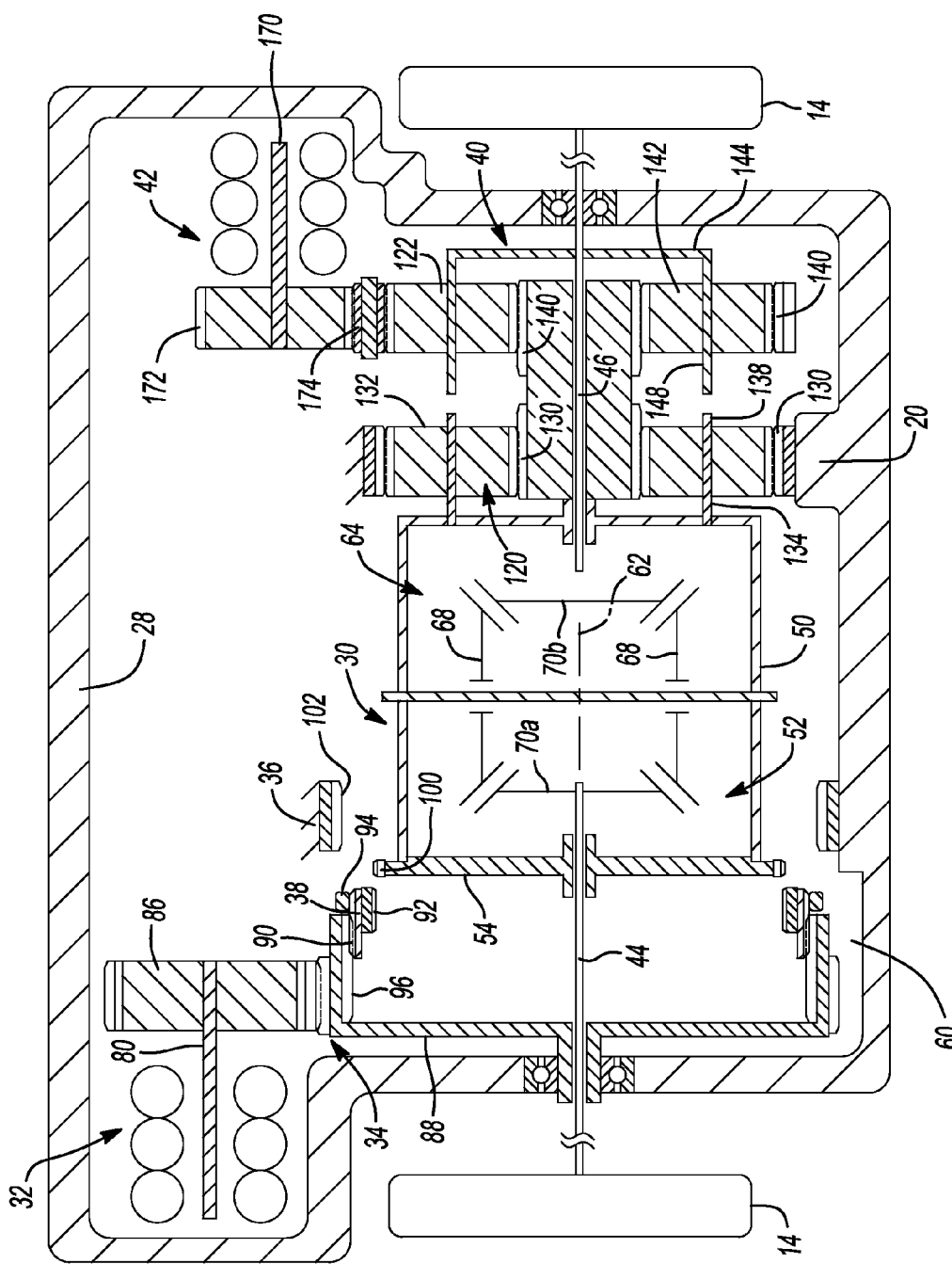
Figure 3:
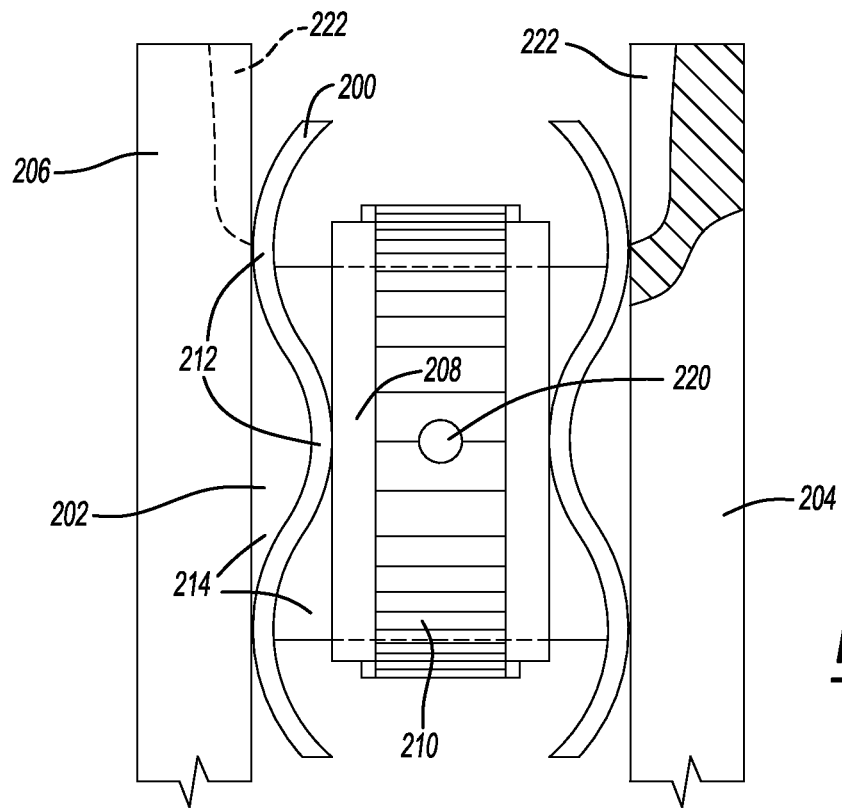
Figure 4:
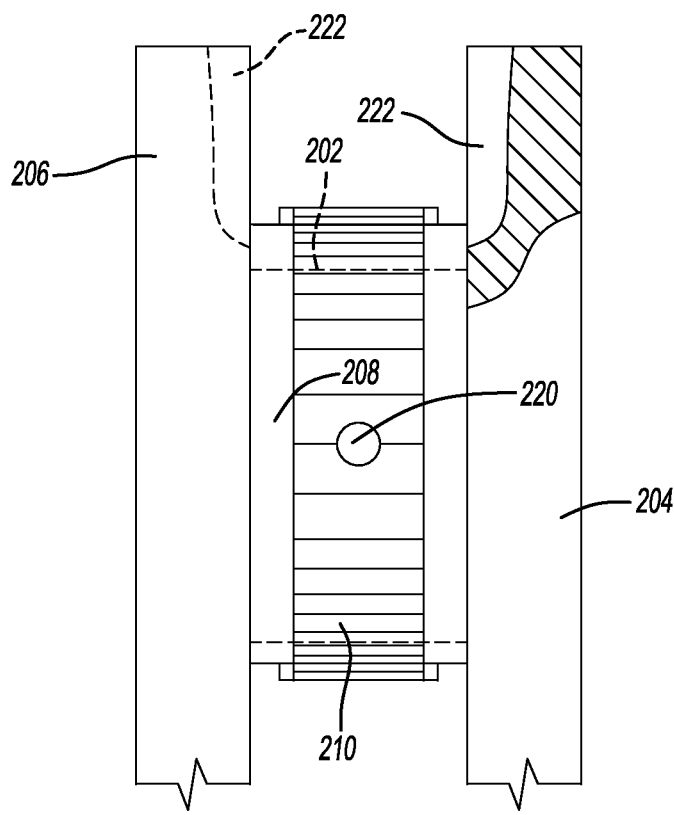

FIG. 1 is a schematic illustration of an exemplary vehicle constructed in accordance with the teachings of the present disclosure;

FIG. 2 is a schematic view of a portion of the vehicle of FIG. 1 illustrating a drive module in greater detail; and FIG. 3 is a side view of a portion of the drive module of FIG. 1 illustrating a first technique for introducing lubrication to an interface between a pin of a planet carrier and a planet gear; and FIG. 4 is a side view similar to FIG. 3 but illustrating a second technique for introducing lubrication to an interface between a pin of a planet carrier and a planet gear.

Corresponding reference numerals indicate corresponding parts throughout the several views of the drawings.

DETAILED DESCRIPTION

With reference to FIG. 1 of the drawings, a vehicle constructed in accordance with the teachings of the present disclosure is generally indicated by reference numeral 10. The vehicle 10 can include an electric drive module 12 that can be employed to drive a pair of vehicle wheels 14. In the particular example provided, the drive module 12 is employed to selectively drive the rear vehicle wheels 14, while a conventional internal combustion engine 16 and transmission 18 are employed to drive a set of front vehicle wheels 20 on a full-time basis. It will be appreciated, however, that the teachings of the present disclosure have application to various diverse vehicle configurations, including vehicle configurations in which one or more drive modules 12 are employed to drive one or more sets of the vehicle wheels on a full-time basis. As such, it will be understood that the particular example discussed herein and illustrated in the appended drawings is merely exemplary.

With reference to FIG. 2, the drive module 12 can include a housing 28, a differential assembly 30, a propulsion motor 32, an input transmission 34, a brake element 36, a mode gear 38, a torque-vectoring transmission 40, a torque-vectoring motor 42, a first axle shaft 44, and a second axle shaft 46.

The differential assembly 30 can include a differential case 50, a speed differentiation means 52, and a differential gear 54. The differential case 50 can be a hollow structure that can be received in a cavity 60 in the housing 28 and supported by the housing 28 for rotation about a rotational axis 62. The speed differentiation means 52 can be received in the differential case 50 and can be configured to transmit rotary power between the differential case 50 and the first and second axle shafts 44 and 46. Any speed differentiation means can be employed, including one or more friction clutches (not shown), but in the particular example provided, the speed differentiation means 52 comprises a differential gearset 64 having a cross pin 66, which is fixed to the differential case 50 for rotation therewith, a pair of pinion gears 68, which are rotatably mounted on the cross pin 66, and a pair of side gears 70a, 70b that are meshed with the pinion gears 68 and rotatable about the rotational axis 62 relative to the differential case 50. A first one of the side gears 70a can be drivingly coupled to the first axle shaft 44. The differential gear 54 can be fixed to the differential case 50. In the particular example provided, the differential gear 54 is a spur ring that is fixedly mounted to the differential case 50.

The propulsion motor 32 can be any type of motor, such as an electric motor, and can be coupled to an appropriate power source, such as one or more batteries 72 (FIG. 1) and controller 74 (FIG. 1). The propulsion motor 32 can be mounted to the housing 28 and can have an output shaft 80 that can be mounted parallel to the rotational axis 62 of the differential case 50. The input transmission 34 can comprise a drive gear 86, which can be coupled to the output shaft 80 for rotation therewith, and a driven gear 88 that can be meshed with the drive gear 86. Those of ordinary skill in the art will appreciate, however, that additional gears may be employed to transmit rotary power between the drive gear 86 and the driven gear 88 and as such, the driven gear 88 need not directly mesh with the drive gear 86. The driven gear 88 can be a ring gear that can be supported for rotation about the first axle shaft 44.

The brake element 36 can be fixedly mounted to the housing 28 and can include one or more features, such as a post or one or more teeth (e.g., teeth 102) that can be engaged by the mode gear 38 as will be discussed in more detail below. In the particular example provided, the brake element 36 is a complete ring gear, but those of skill in the art will appreciate that the brake element 36 could alternatively comprise only a segment of a gear.

The mode gear 38 can be employed in a first mode for transmitting power between the driven gear 88 and the differential gear 54, as well as in a second mode for coupling the differential gear 54 to the brake element 36 to provide a parking brake function in which the first and second axle shafts 44 and 46 are non-rotatable relative to the housing 28. In the example provided, the mode gear 38 comprises a set of first teeth 90, a set of second teeth 92 and a set of third teeth 94. The first teeth 90 can be formed on the outside diameter of a portion of the mode gear 38 and can be meshed with and axially slidably mounted on internal teeth 96 formed on the driven gear 88. The second teeth 92 can be formed on the inside diameter of a portion of the mode gear 38. The third teeth can be formed on the outside diameter of another portion of the mode gear 38. The mode gear 38 can be slid along the rotational axis 62 between a neutral position (shown), a first position, and a second position. In the neutral position the second and third teeth 92 and 94 are not engaged to any other structure such that the mode gear 38 (and the driven gear 88) are permitted to rotate relative to the differential gear 54 and the housing 28.

When the mode gear 38 is positioned in the first position, the second teeth 92 are meshed with teeth 100 of the differential gear 54, while the third teeth 94 are not engaged to any other structure. Accordingly, rotary power produced by the propulsion motor 32 is transmitted through the input transmission 34 and the mode gear 38 to drive the differential gear 54 to thereby provide rotary power to the differential case 50.

When the mode gear 38 is positioned in the second position, the second teeth 92 are meshed with the teeth 100 on the differential gear 54 and the third teeth 94 are meshed with teeth 102 on the brake element 36. The first teeth 90 may optionally be disengaged from the internal teeth 96 on the driven gear 88. Since the brake element 36 is fixed to the housing 28, the meshing of the mode gear 38 with the differential gear 54 and the brake element 36 will inhibit rotation of the differential gear 54. Consequently, the differential case 50 and the first and second axle shafts 44 and 46 will be locked (i.e., non-rotatable) relative to the housing 28.

The torque-vectoring transmission 40 and the torque-vectoring motor 42 can be generally similar to that which is disclosed in co-pending U.S. application Ser. No. 13/182,153 filed Jul. 13, 2011 and entitled "Axle Assembly With Torque Distribution Drive Mechanism", the disclosure of which is incorporated by reference as if fully set forth in detail herein. Briefly, the torque-vectoring transmission 40 can comprise a first planetary gearset 120 and a second planetary gearset 122. The first planetary gearset 120 can comprise a first ring gear 130, which can be fixedly coupled to the housing 28, a plurality of first planet gears 132, a first planet carrier 134, and a first sun gear 136. The first planet gears 132 can be meshed with the first ring gear 130 and the first sun gear 136. The first planet carrier 134 can be fixed to the differential case 50 for common rotation and can comprise pins 138 that each journally support a corresponding one of the first planet gears 132.

The second planetary gearset 122 can comprise a second ring gear 140, a plurality of second planet gears 142, a second planet carrier 144, and a second sun gear 146. The second ring gear 140 can be rotatable about the rotational axis 62. The second planet gears 142 can be meshed with the second ring gear 140 and the second sun gear 146. The second planet carrier 144 can be fixed to the second axle shaft 46 for common rotation and can comprise a plurality of pins 146, each of which journally supporting a corresponding one of the second planet gears 142. The second sun gear 146 can be coupled to the first sun gear 136 for common rotation. The first and second sun gears 136 and 146 can be hollow and can receive the second axle shaft 46 therethrough.

The torque-vectoring motor 42 can have an output shaft 170 that can drive an intermediate gear 172. The intermediate gear 172 can be meshed with teeth 174 that can be formed on the outside diameter of the second ring gear 140.

When the torque-vectoring motor 42 is not operated, the torque-vectoring transmission 40 cooperates with the differential assembly 30 to transmit rotary power to the second axle shaft 46 in a manner that permits differentiation of torque between the first and second axle shafts 44 and 46. In this mode of operation, the drive module 12 will essentially operate as an "open" differential. The torque-vectoring motor 42 can be selectively operated to modify the distribution of torque between the first and second axle shafts 44 and 46. To apply more (or less) torque to the second axle shaft 46, and thereby less (or more) torque to the first axle shaft 44, the torque-vectoring motor 42 can be operated in a first rotational direction (or a second, opposite rotational direction) to apply an additional positive (or negative) moment through the torque-vectoring transmission 40 directly to the second axle shaft 46. The torque-vectoring transmission 40 also produces a negative (or positive) counter moment that is applied to the differential case 50 and which correspondingly reduces (or increases) the moment that is applied to the first axle shaft 44.

Accordingly, it will be appreciated that the present disclosure provides a parking brake mechanism (e.g., brake element 36 and mode gear 38) that is relatively simple in its construction and relatively easy to integrate or package into the drive module 12.

With reference to FIG. 3, one or more wave spring washers 200 can be employed to help promote a flow of lubrication between a planet gear and a planet carrier. The wave spring washer 200 can be mounted on the pin 202 of a planet carrier 204 and can abut a body 206 of the planet carrier 204 and an axial end face 208 of a planet gear 210. The pin 202 can be fixed to the body 206. The wave spring washer 200 can have a plurality of undulations 212 that create an axial space 214 between the body 206 and the wave spring washer 200 and/or the wave spring washer 200 and the axial end face 208 that permits the ingress of lubricant to the interface between the pin 202 and the planet gear 210. The lubricant received between the pin 202 and the planet gear 210 can be directed to an opposite axial end of the planet gear 210, or could be directed to a lubricant egress aperture 220 formed through the planet gear 210. Grooves, scoops and/or deflectors (e.g., grooves 222) could be employed on the body 206 of the planet carrier 204 or a surrounding structure so that lubrication slung from the transmission as it operates may be collected and directed to drain into the axial space 214.

With reference to FIG. 4, an alternative means for lubricating the interface between a planet carrier and a planet gear is illustrated. In this example, the planet carrier 204 and planet gear 210 are associated with a planetary stage of a transmission. During operation of the transmission, lubricant that contacts the body 206 of the planet carrier 204 (e.g., lubricant that is directed or splashed onto the body 206) is directed via grooves 222 to an interface between the planet carrier 204 and the planet gear 210. More specifically, the lubricant can migrate past the axial end face 208 of the planet gear 210 and thereafter between the pin 202 and the inside diametrical surface of the planet gear 210. Lubricant can be discharged from the planet gear 210 through one or more of lubricant egress apertures 220 that are formed through the planet gear 210. In the particular example provided, lubricant is directed toward the lubricant egress aperture(s) 220 from both axial ends of the planet gear 210, the lubricant egress aperture(s) 220 are disposed at a midpoint between opposite axial ends of the planet gear 210, and lubricant expelled from the lubricant egress aperture(s) 220 is employed to lubricate the teeth of the ring and sun gear to which the planet gear 210 is meshed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module comprising:
   a housing;
   first and second axle shafts;
   a differential assembly having a differential case and a pair of output members, the differential assembly being mounted in the housing for rotation about a rotational axis, a first one of the output members being coupled to the first axle shaft for common rotation;
   a propulsion motor;
   a brake element fixed to the housing;
   a torque-vectoring transmission that cooperates with the differential assembly to transmit rotary power to the second axle shaft;
   a mode gear that is movable between a first position and a second position, wherein positioning of the mode gear in the first position permits transmission of rotary power between the propulsion motor and the differential assembly, and wherein positioning of the mode gear in the second position couples the differential assembly to the housing to inhibit rotation of the first axle shaft.

2. The drive module of claim 1, wherein the mode gear is further movable into a neutral position in which the mode gear is de-coupled from the differential assembly and the brake element.

3. The drive module of claim 1, wherein the mode gear is slidably movable along the rotational axis.

4. The drive module of claim 3, wherein the torque-vectoring transmission comprises a driven gear that is rotatably disposed about the first axle shaft.

5. The drive module of claim 4, wherein the mode gear is movable into a neutral position between the first and second positions and wherein the mode gear is engaged to the driven gear in each of the neutral, first and second positions.

6. The drive module of claim 1, wherein the torque-vectoring transmission comprises a first planetary gearset and a second planetary gearset, wherein the first planetary gearset has a first sun gear, a first ring gear and a first planet carrier, wherein the second planetary gearset has a second sun gear and a second planet carrier, wherein the first and second sun gears are coupled to one another for common rotation, wherein the first planet carrier is coupled to the differential case for common rotation, wherein the first sun gear is non-rotatably coupled to the housing.

7. The drive module of claim 6, wherein the second planetary gearset comprises a second ring gear that is rotatable about the rotational axis.

8. The drive module of claim 1, wherein the brake element comprises at least a portion of a gear.

9. A drive module comprising:
   a housing;
   first and second axle shafts;
   a differential assembly having a differential case and a pair of output members, the differential assembly being mounted in the housing for rotation about a rotational axis, a first one of the output members being coupled to the first axle shaft for common rotation;
   a propulsion motor;
   an input transmission that is configured to receive rotary power from the propulsion motor;
   a brake element fixed to the housing;

a torque-vectoring transmission receiving rotary power from the differential case and configured to output rotary power to the second axle shaft;

a torque-vectoring motor that is selectively operable to provide a secondary input to the torque-vectoring transmission to change a torque distribution between the first and second axle shafts; and a mode gear that is movable between a first position and a second position, wherein positioning of the mode gear in the first position couples the input transmission to the differential assembly such that rotary power produced by the propulsion motor is employed to drive the differential assembly, and wherein positioning of the mode gear in the second position couples the differential assembly to the housing to inhibit rotation of the first and second axle shafts.

10. The drive module of claim 9, wherein the mode gear is further movable into a neutral position in which the mode gear is de-coupled from the differential assembly and the brake element.

11. The drive module of claim 9, wherein the mode gear is slidably movable along the rotational axis.

12. The drive module of claim 11, wherein the input transmission comprises a driven gear that is rotatably disposed about the first axle shaft.

13. The drive module of claim 12, wherein the mode gear is further movable into a neutral position in which the mode gear is de-coupled from the differential assembly and the brake element, and wherein the mode gear is engaged to the driven gear in each of the neutral, first and second positions.

14. The drive module of claim 9, wherein the torque-vectoring transmission comprises a first planetary gearset and a second planetary gearset, wherein the first planetary gearset has a first sun gear, a first ring gear and a first planet carrier, wherein the second planetary gearset has a second sun gear and a second planet carrier, wherein the first and second sun gears are coupled to one another for common rotation, wherein the first planet carrier is coupled to the differential case for common rotation, wherein the first sun gear is non-rotatably coupled to the housing.

15. The drive module of claim 14, wherein the second planetary gearset comprises a second ring gear that is rotatable about the rotational axis.

16. The drive module of claim 9, wherein the brake element comprises at least a portion of a gear.

17. A method for operating a drive module having a housing, an input transmission, first and second axle shafts, a differential assembly, a propulsion motor, a torque-vectoring transmission, a mode gear and a brake element, the differential assembly having a differential case and a pair of output members, the differential assembly being mounted in the housing for rotation about a rotational axis, a first one of the output members being coupled to the first axle shaft for common rotation, the torque-vectoring transmission being configured to cooperate with the differential assembly to transmit rotary power to the second axle shaft, the brake element being fixed to the housing, the method comprising:

positioning the mode gear in a first position to couple the input transmission to the differential assembly such that rotary power produced by the propulsion motor is transmitted through the mode gear and employed to drive the differential assembly; and positioning the mode gear in a second position that couples the differential assembly to the housing to inhibit rotation of the first and second axle shafts.

* * * * *